United States Patent [19]

Bergen

[11] Patent Number: 5,000,124

[45] Date of Patent: Mar. 19, 1991

[54] ELEVATED, ADJUSTABLE PET FEEDER

[76] Inventor: Larry L. Bergen, P.O. Box 50876, Midland, Tex. 79710

[21] Appl. No.: 402,610

[22] Filed: Sep. 5, 1989

[51] Int. Cl.$^5$ .............................................. A01K 5/00
[52] U.S. Cl. ..................................... 119/63; 211/75; 248/295.1
[58] Field of Search ...................... 119/61, 63, 18, 72; 211/75, 76, 103, 133; 248/295.1, 297.5, 311.2; 232/1 E

[56]  References Cited

U.S. PATENT DOCUMENTS

| | | | |
|---|---|---|---|
| 1,531,842 | 3/1925 | Carpenter | 119/63 |
| 1,698,355 | 1/1929 | Wiemer | 119/61 X |
| 2,372,073 | 3/1945 | Flournoy | 119/61 X |
| 2,455,213 | 11/1948 | Bell | 211/103 |
| 2,943,831 | 5/1960 | Goss | 248/297.5 X |
| 2,988,048 | 6/1961 | Zimmerman | 119/61 X |
| 3,180,605 | 4/1965 | Ewaskowitz, Jr. | 248/295.1 X |
| 3,301,217 | 1/1967 | Prowinsky | 119/51 |
| 3,651,787 | 3/1972 | Cooper | 119/51 |
| 3,661,121 | 5/1972 | Zielen | 119/61 |
| 4,030,451 | 6/1977 | Miller | 119/51 |
| 4,205,629 | 6/1980 | Wix | 119/61 X |
| 4,399,772 | 8/1983 | Salinas | 119/61 |
| 4,587,930 | 5/1986 | Trego | 119/61 |
| 4,658,759 | 4/1987 | Brown | 119/61 |

FOREIGN PATENT DOCUMENTS

| | | | |
|---|---|---|---|
| 1242013 | 6/1967 | Fed. Rep. of Germany | 248/295.1 |
| 0749451 | 5/1956 | United Kingdom | 119/63 |

*Primary Examiner*—Robert P. Swiatek
*Assistant Examiner*—Todd E. Manahan
*Attorney, Agent, or Firm*—Marcus L. Bates

[57]  ABSTRACT

A combination feeding bowl and wall mounting apparatus by which the bowl can be elevated above the surface of a floor, while at the same time the bowl is displaced from the wall. A mount fixture is attached to the wall structure and a rod is slidably received through the mount fixture by a handle attached to the upper end of the rod. The rod has a support member at the lower end that holds a bowl. A trigger is attached to a brake device which is enclosed within the mount fixture by which the friction of the rod can be increased to hold the bowl at a specific elevation respective to the mount fixture or the floor. The food contained within the bowl is positioned away from crawling insects and a cover protects the contents of the bowl from flying insects.

9 Claims, 2 Drawing Sheets

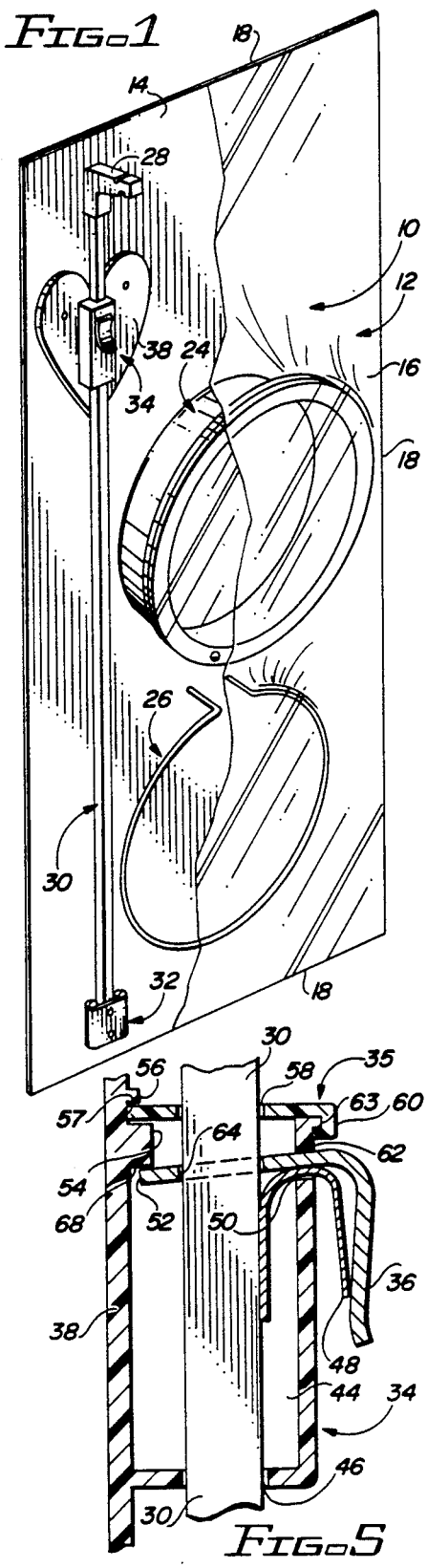

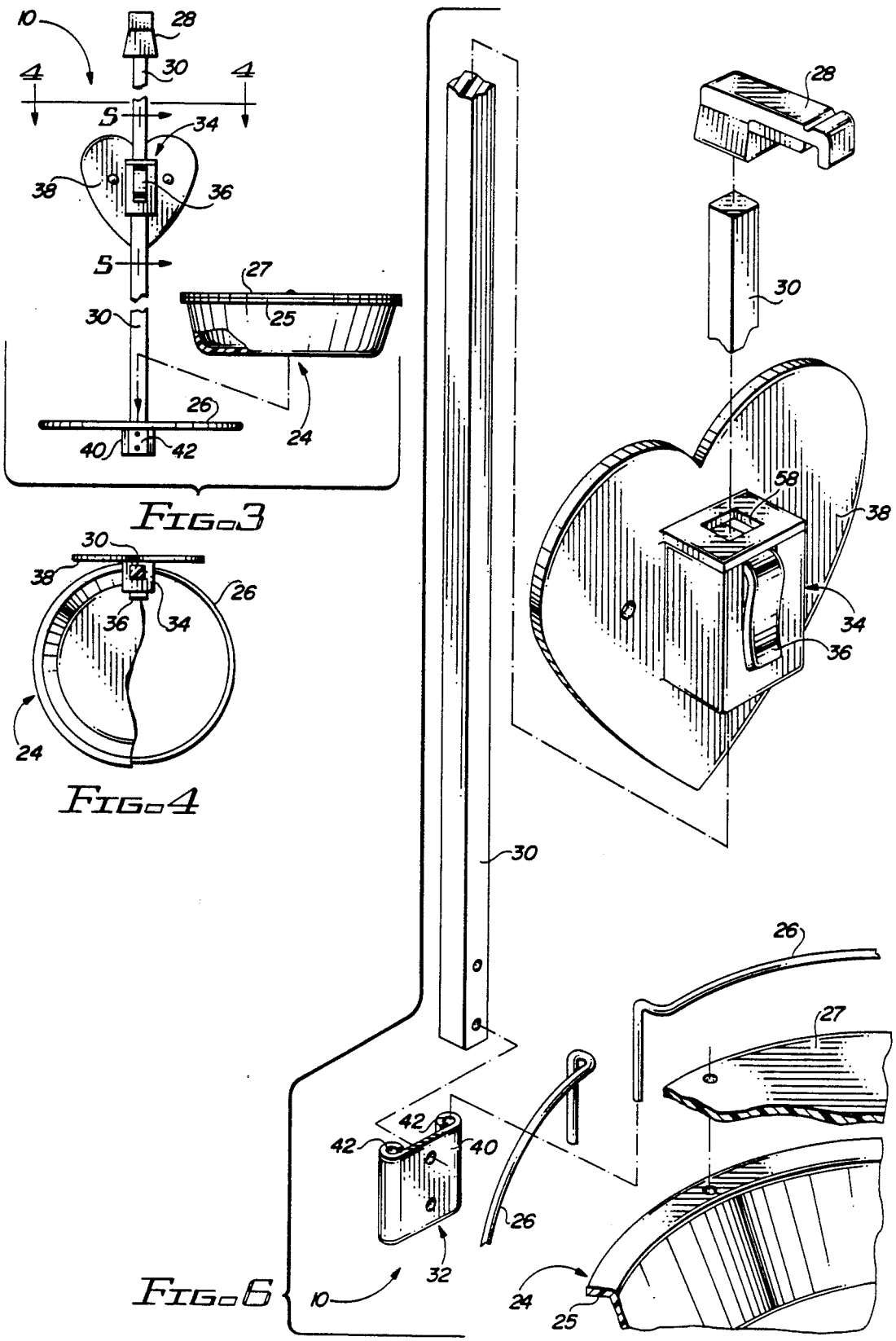

ELEVATED, ADJUSTABLE PET FEEDER

BACKGROUND OF THE INVENTION

The prior art discloses a number of pet feeder apparatus for feeding both large and small animals, and especially domesticated animals that live indoors, such as, for example, cats and dogs. It is desirable to be able to make food available for pets at appropriate times. It is, therefore, an accepted practice to simply leave a bowl of food at some out of the way location, usually on a porch or in the kitchen. Feeding the pet requires having to bend over to place the feeding dish on the floor and thereafter, to again bend over to retrieve the dish. This is hard on the back of older people. Also, crawling bugs are attracted to the contents of an open feeding bowl. Further, some pets can remove the bowl to most any place in the house and a person is liable to trip over the bowl, especially in a darkened room.

Accordingly, it would be desirable to provided a covered feeding bowl and to eliminate the need for bending over to place or to retrieve a feeding or water bowl from the floor. It would further be desirable to be able to elevate the feeding bowl above the floor to most any selected height according to the size of the pet, and to support the bowl free of an adjacent wall. These desirable attributes would have the additional advantage of training the pet to keep its head up, even when eating; but more importantly, crawling bugs would be unable to get into the bowl because the bowl would be suspended above the floor and away from the adjacent wall.

Further, the bowl should be easily retrievable for cleaning and, preferably, of a design to enable it to be placed within a dishwasher. This also would reduce infection for the pet because a clean bowl is much more sanitary than one left on the floor or on the ground.

Apparatus having these desirable attributes is the subject of the present invention.

SUMMARY OF THE INVENTION

This invention comprises a pet feeder which is easily disassembled into a plurality of component parts for packaging in a small, inexpensive, illustrative type carton. The pet feeder, when assembled, comprises a mount fixture adapted to be easily secured to a vertical wall structure at a position that enables a bowl thereof to be adjustably positioned respective to the floor, while at the same time the bowl is spaced from the wall. The bowl is adapted to contain pet food and is removably received within a receptacle for supporting the bowl. A vertically disposed rod having the receptacle attached at the lower end thereof and a handle attached at the upper end thereof is slidably received within the mount fixture. A trigger arrangement is connected to the mount fixture, and when depressed, permits the rod to slide vertically upward or downward, thereby positioning the bowl respective to the floor so that the bowl is easily retrieved, is optimumly positioned for the animal to be fed, and the bowl remains free from both the floor and the wall structure at all times.

Accordingly, a primary object of the present invention is the provision of a pet feeder apparatus that enables a food bowl thereof to be easily retrieved without unduly bending one's back.

Another object of this invention is the provision of a pet feeder that is adjustably positioned clear of the floor and the wall and which includes a removable bowl that can be further elevated for ease of removal from the apparatus.

A further object of the present invention is the provision of a pet feeder for holding pet food at an optimum position for feeding most any size pet, and wherein the bowl is maintained clear of both the floor and the wall structure and can be positioned anywhere within a range of vertical travel.

An additional object of this invention is the provision of a wall mounted fixture for vertically positioning a removable feeding or water bowl and for holding the bowl clear of the floor and the wall and thereby avoiding contamination of any food that may remain in the bowl.

A still further object of the present invention is the provision of a pet feeder apparatus that enables a food bowl thereof to be easily retrieved without unduly bending one's back; that is adjustably positioned clear of the floor and the wall; that includes a removable bowl which can be further elevated for ease of removal from the apparatus; and wherein any number of bowls filled with food or liquid can be selectively placed in the receptacle attached at the lower end of the pet feeder.

These and various other objects and advantages of the present invention will become readily apparent to those skilled in the art upon reading the following detailed description and claims and by referring to the accompanying drawings.

The above objects are attained in accordance with the present invention by the provision of a combination of elements which are fabricated in a manner substantially as described herein.

BRIEF DESCRIPTION OF THE DRAWINGS

FIG. 1 is a perspective view of a packaged pet feeder made in accordance with the present invention, with some parts removed therefrom;

FIG. 2 is a broken, part cross-sectional view of a pet feeder made in accordance with the present invention;

FIG. 3 is a reduced, diagrammatical, broken, front view of the pet feeder disclosed in the foregoing figures, with some parts removed therefrom and some of the remaining parts shown in cross-section;

FIG. 4 is a top, cross-sectional view taken along line 4—4 of the pet feeder disclosed in FIG. 3, with some parts being removed therefrom;

FIG. 5 is an enlarged, broken, part cross-sectional view taken along line 5—5 of FIG. 3; and, FIG. 6 is an exploded, broken, part cross-sectional view of the pet feeder of this invention.

DETAILED DESCRIPTION OF THE PREFERRED EMBODIMENT

In the figures of the drawings, there is disclosed a pet feeder 10 made in accordance with the present invention. FIG. 1 shows the pet feeder 10 packaged for distribution within package 12 that comprises a cardboard supporting bottom 14 and a transparent overlay 16. The outer periphery 18 of package 12 is sealed, as noted, using standard techniques.

In FIG. 2, together with other figures of the drawings, numeral 20 indicates the wall of a room while numeral 22 indicates an ordinary floor, such as found in a home, for example.

A bowl 24 has a circumferentially extending, outwardly directed rim 25 that is supported by a receptacle 26, illustrated herein as a discontinuous wire loop. The upper end of the pet feeder 10 terminates in a handle 28 that is attached to and allows one to conveniently vertically move rod 30. Rod 30 preferably is solid plastic and is square in cross-sectional configuration, although it can be made into any number of other geometrical cross-sectional configurations, if desired.

The lower end of the pet feeder terminates in a support member 32 for the bowl receptacle. A medial part of rod 30 is received within a mount fixture 34, the details of which will be more fully discussed later on herein.

In FIGS. 2, 5, and 6, the mount fixture apparatus 34 includes a spring-loaded trigger 36 that is conveniently depressed by one's thumb. A heart shaped wall mounting member 38 is secured to the before mentioned wall 20 by any suitable means, such as, for example, the illustrated screws. The rod 30 extends through the mount fixture down to the support member 32. A fixture plate 40 is attached to the marginal end of rod 30 and includes spaced, parallel, vertical passageways 42 that form identical sockets at the opposed sides thereof for receiving the marginal opposed terminal ends of the receptacle 26 therein. The receptacle is shown as a discontinuous wire ring having down-turned terminal ends aligned in a vertical plane that is perpendicular to the wire ring in the illustrated manner of the drawings.

In FIG. 5, chamber 44 is formed within and defined by the mount fixture apparatus 34. Lower square hole 46 loosely receives a medial length of rod 30 in a slidable manner therethrough. A bent spring 48, preferably a bent-up U-shaped rectangular piece of spring steel, is formed about the lower end of slot 50 and receives a medial part of the trigger 36 thereagainst, as well as the medial part of spring 48 in the illustrated manner of FIG. 5.

Numeral 52 indicates the inside terminal edge of trigger 36 while numerals 54 and 56 disclose spaced platforms or enlargements which are an integral part of the heart shaped support, and which provide a groove 57 therebetween within which the rear edge of closure member 35 is received in captured relationship therein to secure the closure member 35 at the top of the mount fixture.

Numeral 58 indicates a square hole that is identical to aperture 46 and slidably receives a medial portion of the rod 30 loosely therethrough. The top plate or closure member 35 further includes a forward edge 60 that is turned 180 degrees and thereby forms an upper wall as well as an attachment that is mated to the forward wall of fixture 34 at a location slightly above the trigger slot 62. Numeral 63 is an outwardly directed shelf or edge made integral with the outer wall of the mount fixture 34 and which is snapped into place respective to the female groove seen at 63 of closure member 35.

Still looking at FIG. 5, numeral 62 indicates the upper edge of slot 50, while the before mentioned numeral 63 indicates the edge of box 34 that is received within the closure member 35. Numeral 64 is a square hole formed centrally through the rear marginal length of trigger 36 for engaging and locking the movable square rod 30 in any vertical position when the trigger is released. The square holes 46, 58 and 64 are axially aligned along a common vertical axis and spaced apart as shown to simultaneously and slidably receive a medial length of rod 30 therethrough, while trigger 36 and spring 48 apply friction to rod 30 for selectively positioning the bowl 24 at any desired elevation within a range of possible values or altitudes. Those skilled in the art will now appreciate that a downward force on rod 30 canters the trigger hole 64 out of the horizontal plane and thereby engages opposed surfaces of the rod to lock the rod to the mount fixture. The end 52 of trigger 36 is urged against shoulder 68 of the platform 54.

In operation, as seen in FIG. 1, the apparatus can be packaged with all of the components thereof attractively illustrated so that the perspective purchaser can appreciate the multitude of unforeseen advantages that may be derived by the present invention. The apparatus, when assembled into the configuration of FIG. 2, enables parts thereof to be raised or lowered vertically as indicated by the arrow connecting the solid lines seen above the dot-dash lines.

The apparatus is assembled by screwing the heart shaped wall mounting member onto an existing wall structure 20, assembling spring 48, trigger 36, closure member 35, and thereafter, placing rod 30 therethrough. Next, the handle 28 is snapped or forced into place at the upper end of rod 30, thereby capturing a medial length of the rod in a slidable manner within the mount fixture 34. The support member is screwed onto the lower end of the rod, then the bowl receptacle is placed into the sockets.

The trigger 36 is biased by spring 48 so that the square passageway 64 therethrough is canted at an angle, thereby engaging opposed sidewalls of the rod 30 with increased friction. When the trigger is depressed, the square hole 64 of the trigger is aligned into a horizontal plane and the opposed edges of hole 64 thereby loosely receive the opposed wall surface of rod 30 therein in low friction relationship therewith to thereby permit the rod to be moved vertically and secured into any desired position within the possible range of positions.

The receptacle 26 for the bowl preferably is a suitable length of sturdy wire having the distal ends thereof turned vertically downward, with the medial part thereof being deformed into a circumferentially extending loop of a size to engage rim 25 of the bowl in a supported manner thereon and thereby transfer the load presented by the bowl and the contents of the bowl into the receptacle; into the distal ends of the receptacle; into sockets 42 of support 32; into the lower marginal end of rod 30; into the mount fixture 34; into the heart shaped wall mounting member 38; and then into the wall structure 20.

The bowl closure member 27 is pivotally secured to rim 25 of the bowl. The closure 27 can be pivoted to gain or prevent access to the contents of the bowl. The fastener at the pivot can take on any number of different forms.

The bowl preferably has a lower flat surface that can be safely supported on the floor, and further has an upwardly diverging, circumferentially extending sidewall that is out-turned about the entire periphery to form the illustrated rim at 25. The rim 25 is in the form of an annular flange having a diameter much greater than the receptacle 26 and is thereby received in supported relationship on the receptacle. Yet, the bowl is easily lifted from the receptacle and can be washed as desired. Moreover, any number of bowls can be stacked in a very small area due to the geometrical configuration thereof and one substituted for the other. Further, the bowl can be rotated about its vertical axis, thereby placing the pivot pin wherever desired. Any number of covered bowls may be stored in the icebox to provide a variety of different meals for the pet.

The configuration of the bowl imparts great structural integrity thereinto. The rim 25 of the bowl provides a support surface for the receptacle 26 that secures the bowl to the remainder of the apparatus in a manner that renders the bowl easily removable by humans but which makes it unlikely to be removed by the pet.

It is preferred that the upper marginal end of rod 30 have a horizontal groove formed therein that cooperates with a downwardly directed cavity formed in handle 28 in such a manner that the handle is locked to rod 30 when the handle and rod are mated. Alternatively, the handle can have a rod receiving cavity of close tolerance converging configuration, whereby the handle, when forced onto the marginal end of the rod, is secured by a tight friction fit. Still further, the rod and handle can simply be cemented together, or for that matter a screw can be placed perpendicularly respective to the handle and through the rod cavity thereof.

The heart shaped wall mounting fixture is made integral with the mount fixture 34. Where deemed desirable, the wall mounting member 38 can receive a large cutout adjacent to the wall 20 to enable the wall mounting member, mount fixture 34, and closure member 35 to be made as an integral part, with the trigger and spring being assembled through the slot 50, 62 by working through the cutout that is adjacent to the illustrated mounting screws of FIG. 2.

The cover 27 forms a pivotal closure member by which the contents of the bowl can be protected before and after the pet has eaten. Residual food left in the container can be isolated from contamination by rotating the closure member 27 about the illustrated rivet that forms the pivot of FIGS. 2 and 6, for example.

After the pet has eaten, a fresh bowl of water can be substituted for the emptied food bowl. Several covered bowls can be accumulated and selectively used to vary the pet's diet, as may be desired.

The capacity of the bowl is 2 to 3 pounds, depending upon the density of the food. The bowl size can be varied, when desired, to provide an appropriate capacity for accommodating a specific size pet.

I claim:

1. An improved pet feeder comprising a bowl for storing pet food therein, a support member, a mount fixture, an elongated rod having an upper end and a lower end, said lower end is attached to said support member and a medial length of said rod slidably received within said mount fixture;

a receptacle; said support member supporting said receptacle and said bowl removably received by said receptacle;

whereby said mount fixture is adapted to be secured to a vertical wall structure; said mount fixture having brake means associated therewith for holding the medial length of said rod at selected elevated positions respective to said mount fixture and thereby rendering said bowl inaccessible respective to a floor area when the mount fixture is attached to a wall structure;

trigger means supported by said mount fixture for releasing said brake means;

said mount fixture including a housing having an axial passageway formed therethrough, said rod extending through the passageway with said brake means engaging said rod and connected to be released by said trigger means; and a handle at the upper end of said rod by which a medial length of the rod can be slidably moved within the passageway of said mount fixture and thereby elevate said bowl into any desired position within a range of positions 2. The improved pet feeder of claim 1 wherein said support member includes a plate member attached to the lower end of the rod, said plate member having opposed sides formed into a pair of sockets; and said receptacle has ends made into a configuration to be received within said sockets, and thereby attach the receptacle to the support member.

3. The improved pet feeder of claim 2 wherein said sockets are arranged parallel to the rod; said receptacle is an elongated, discontinuous loop member having marginal ends bent into alignment with said sockets and received within the sockets.

4. A combination feeding bowl and wall mounting apparatus by which the bowl can be elevated above the surface of a floor while at the same time the bowl is displaced from the wall, comprising:

a mount fixture adapted to be attached to the wall at a location above the floor; an elongated rod slidably received through said mount fixture and having a handle at an upper end and a support member at a lower end thereof;

brake means associated with said mount fixture, said brake means including a lateral extension having a hole therethrough, said rod extending through said hole such that friction between the surface of the rod and the hole in the lateral extension can be increased to hold the bowl at a selected elevation respective to the mount fixture;

a receptacle; said bowl supported on said receptacle and said receptacle supported by said support member;

said extension connected to be moved to thereby release said brake means and permit said rod to slidably move respective to the mount fixture;

said mount fixture includes a wall structure that forms a housing having an axial passageway formed therethrough, said rod having a medial length received within said passageway with said brake means engaging the medial length of said rod;

whereby said rod can be slidably moved in said mount fixture and thereby elevate said bowl into any position within a range of positions, whereupon the bowl can be removed from the receptacle.

5. The combination of claim 4 wherein said support member includes a plate member attached to the lower end of the rod, said plate member having opposed sides formed into a pair of sockets; and said receptacle has ends made into a configuration to be received within said sockets, and thereby attach the receptacle to the support member.

6. The combination of claim 5 wherein said sockets are arranged parallel to the rod; said receptacle is an elongated loop member having marginal ends thereof bent into alignment with said sockets and received within the sockets.

7. A pet feeder comprising a bowl for storing pet food therein, an elongated rod having a lower end opposed to an upper end with said lower end being attached to a support member, and a medial length thereof slidably received within a mount fixture; said mount fixture adapted to be secured to a vertical wall structure at a location above a floor area; said mount fixture having brake means associated therewith for arresting and holding said rod at selected elevated positions respective thereto and thereby rendering said bowl inaccessible respective to the floor area;

and a handle means located at the upper end of said rod by which the rod can be slidably moved in said mount fixture and thereby elevate said bowl into position within a range of positions;

wherein said bowl is supported on a receptacle and said receptacle is supported by said support member, wherein said brake means includes a trigger having a lateral extension with a hole therethrough, said rod extending through the hole in the lateral extension;

said mount fixture includes a wall structure that forms a housing having an axial passageway formed therethrough with said medial length of said rod received within said passageway, whereby said brake means releasably engages said rod; and said extension is manipulated by said trigger to release the brake means thus enabling the rod to be slidably moved in said mount fixture and thereby elevate said bowl into any position within a range of positions whereupon the bowl can be removed from the receptacle.

8. The pet feeder of claim 7 wherein said support member is a plate member that is attached to the lower end of the rod, said plate member has sockets formed at opposed sides thereof for supporting said receptacle therefrom; said receptacle has ends made complementary to and received within said sockets.

9. The pet feeder of claim 8 wherein said sockets are arranged parallel to the rod; said receptacle is a discontinuous elongated loop member having opposed ends that are bent into alignment with and received within the sockets.

* * * * *